Jan. 30, 1945.  M. H. SIDEBOTHAM  2,368,429
MACHINE FOR MAKING PACKAGES
Filed April 23, 1942   12 Sheets-Sheet 4

Inventor,
Melvin H. Sidebotham,
By, Roderick Wm Hoag, Atty.

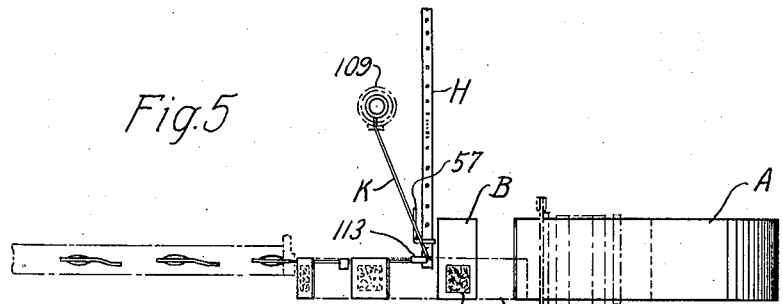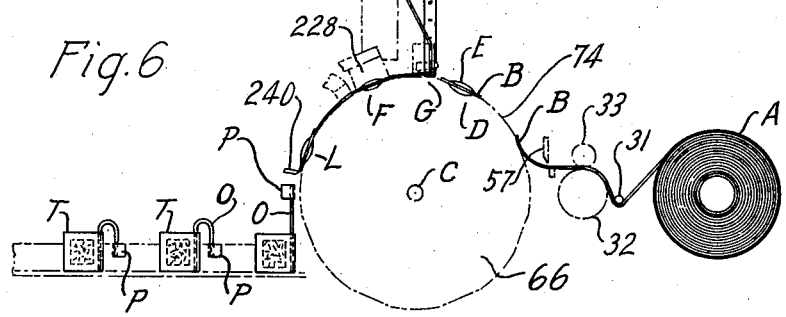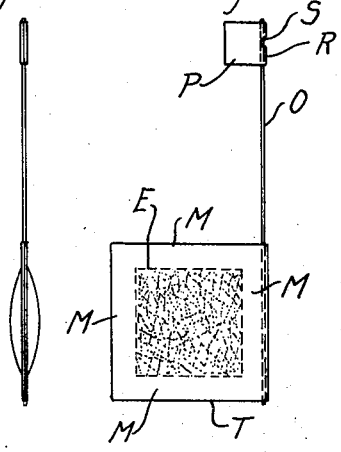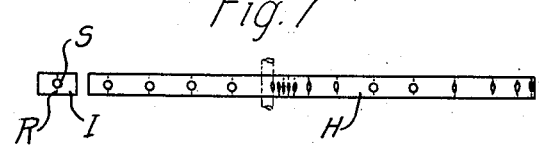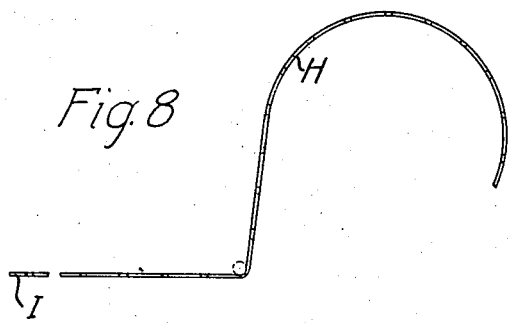

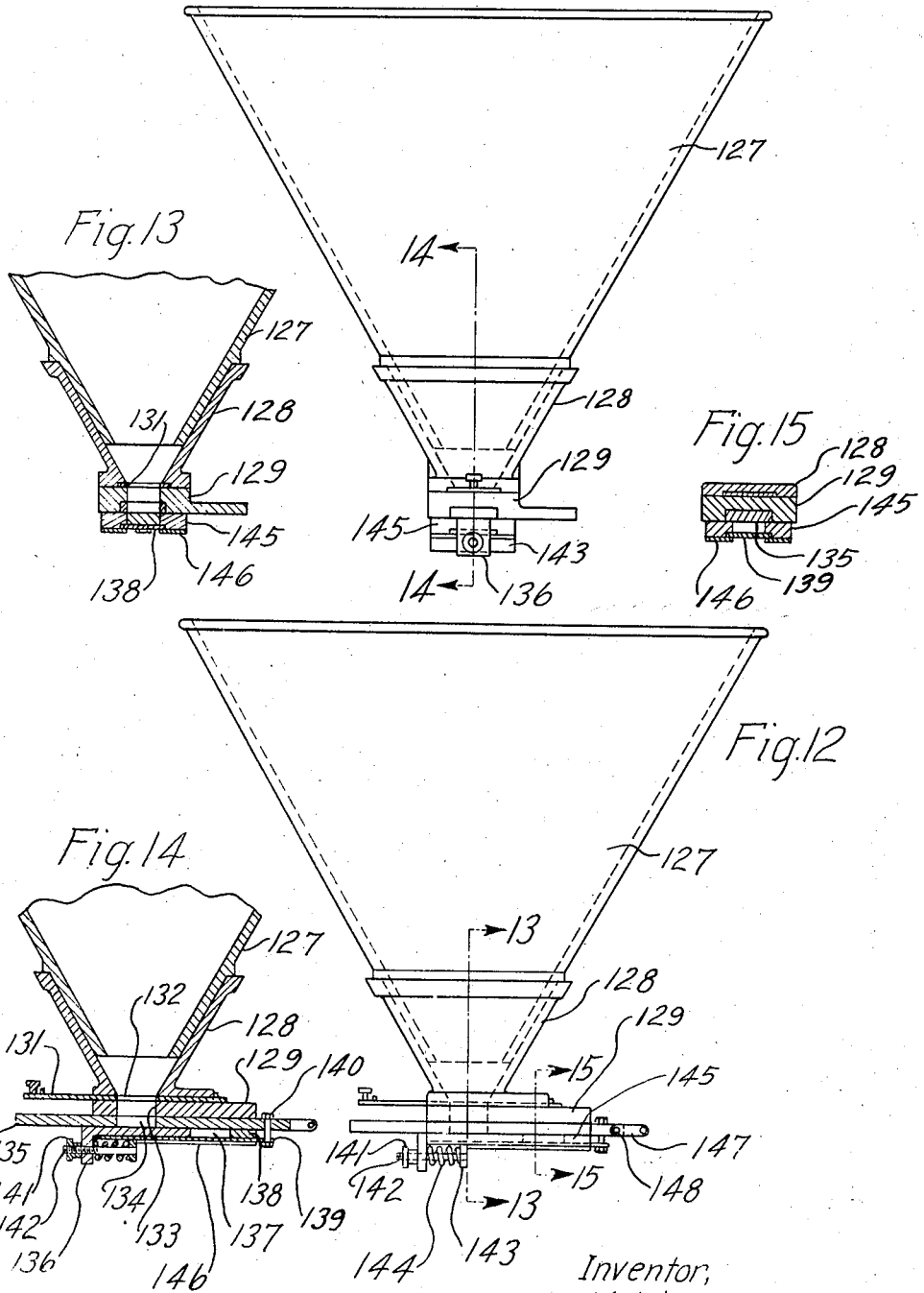

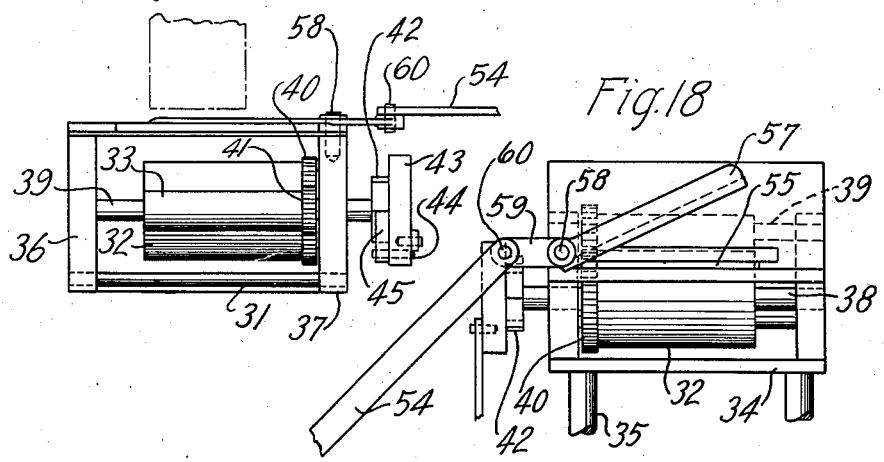

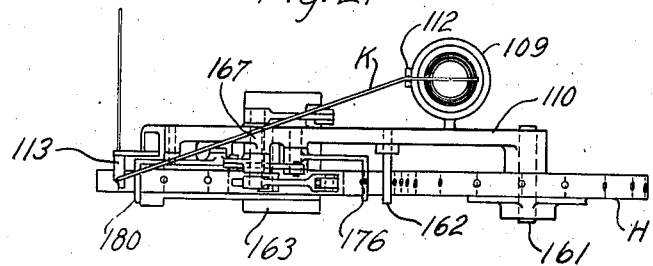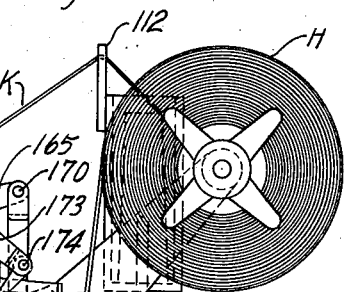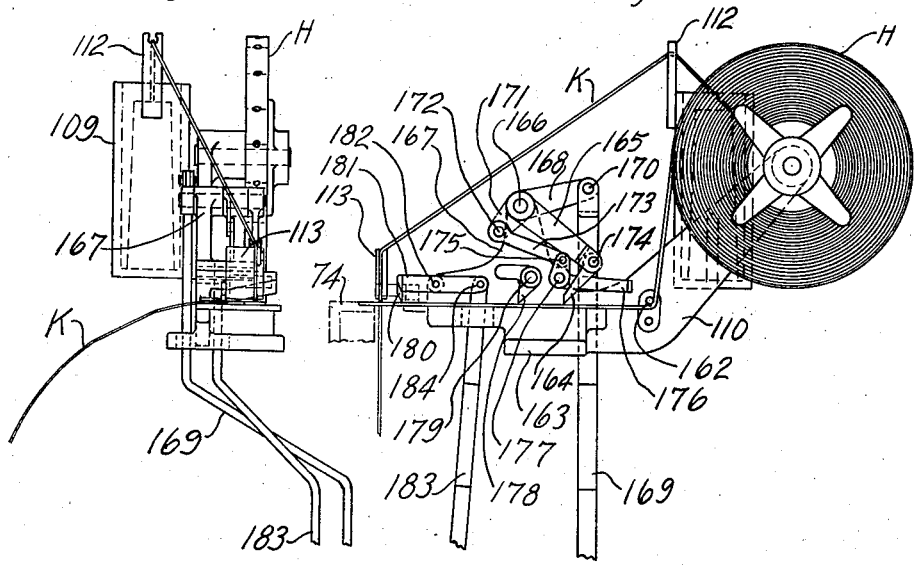

Jan. 30, 1945.　　　M. H. SIDEBOTHAM　　　2,368,429
MACHINE FOR MAKING PACKAGES
Filed April 23, 1942　　12 Sheets-Sheet 9
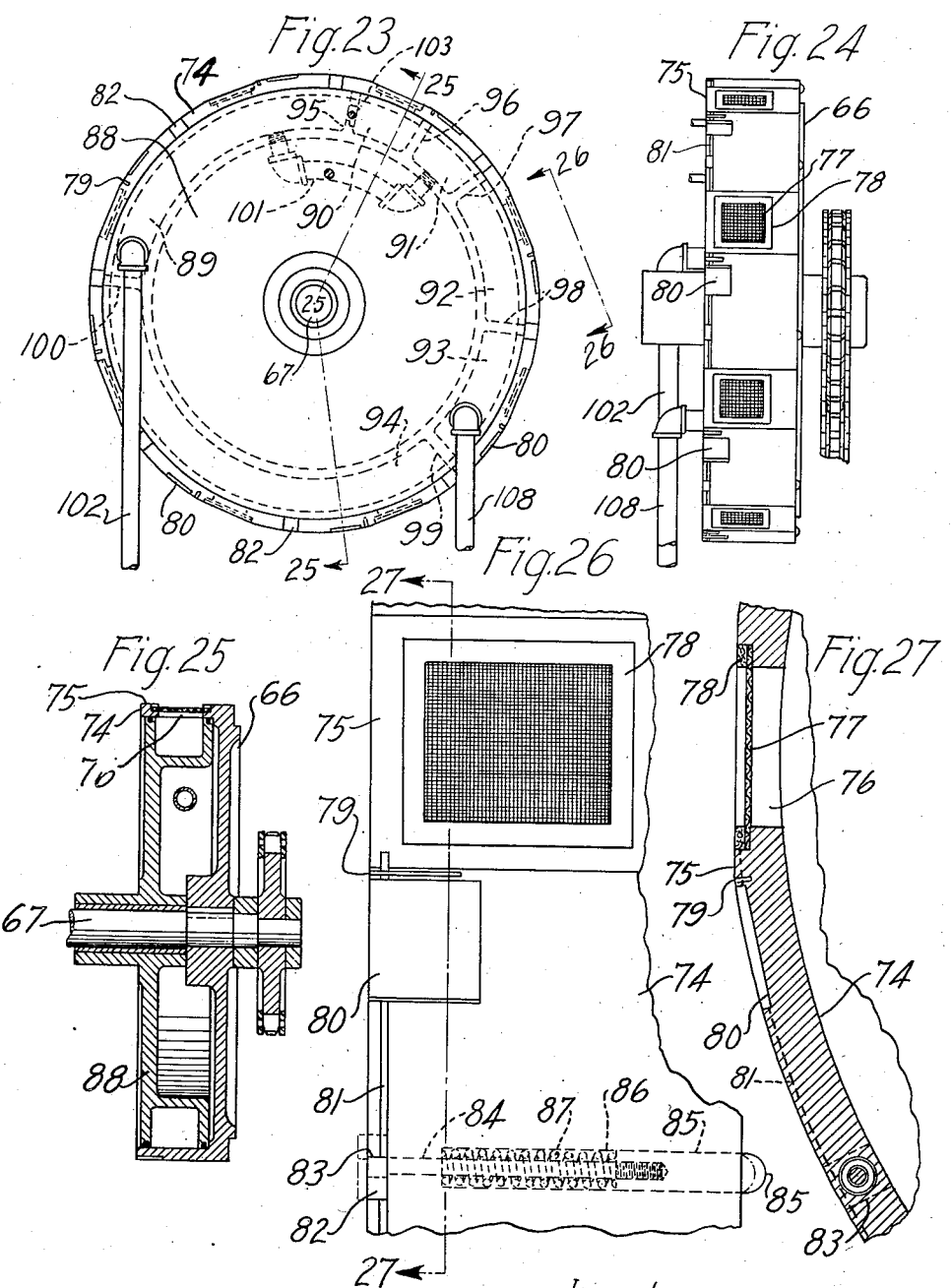
Inventor,
Melvin H. Sidebotham,
By, Roderick Wm Hoag, Atty.

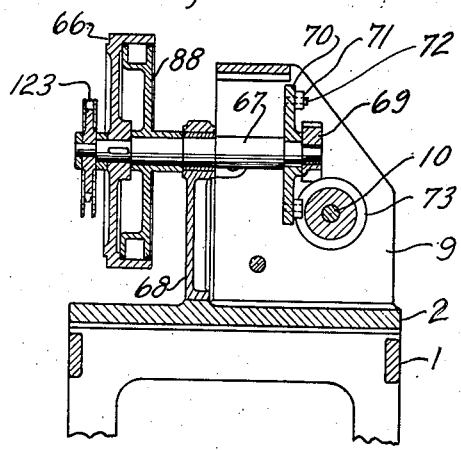
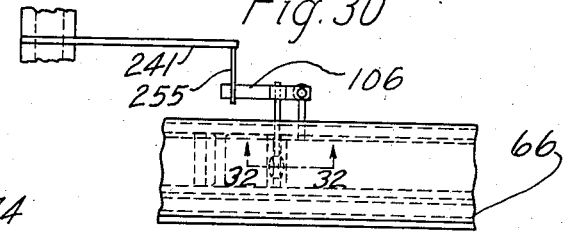
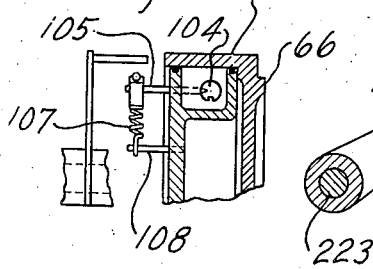
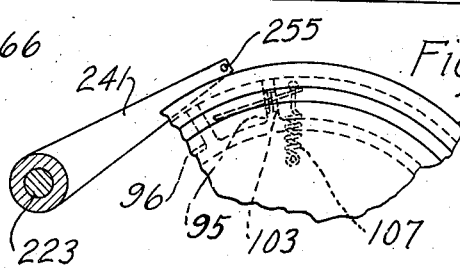
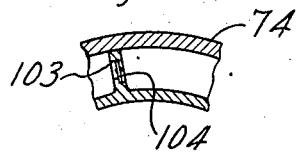

Jan. 30, 1945.　　　M. H. SIDEBOTHAM　　　2,368,429
MACHINE FOR MAKING PACKAGES
Filed April 23, 1942　　　12 Sheets-Sheet 11
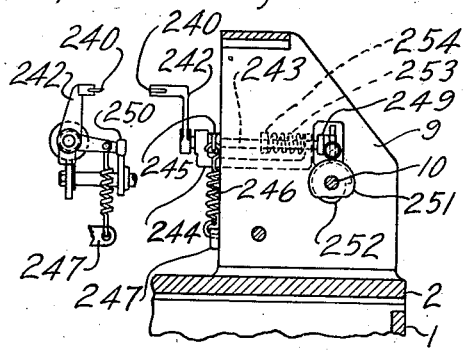
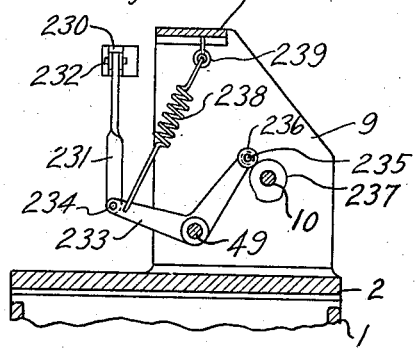
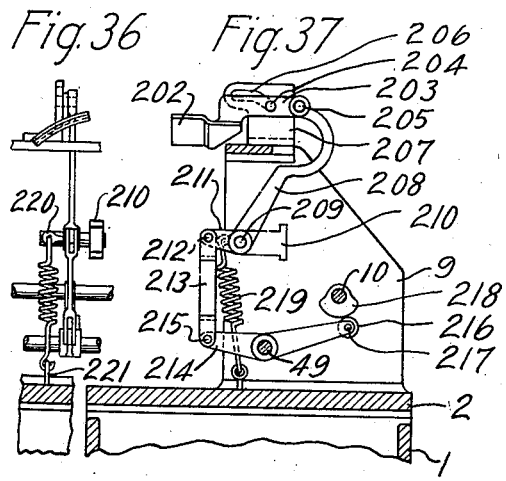
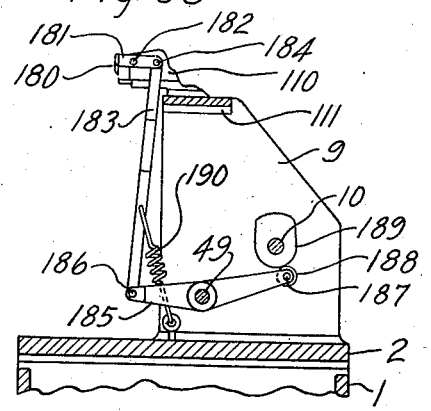
Inventor,
Melvin H. Sidebotham,
By, Roderick Wm Hoag, Att'y.

Jan. 30, 1945. M. H. SIDEBOTHAM 2,368,429
MACHINE FOR MAKING PACKAGES
Filed April 23, 1942 12 Sheets-Sheet 12
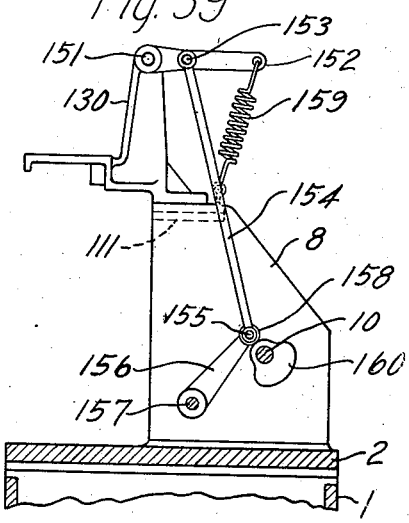
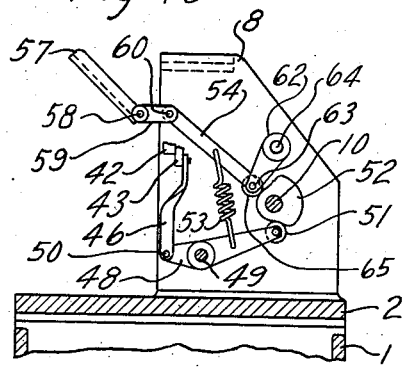
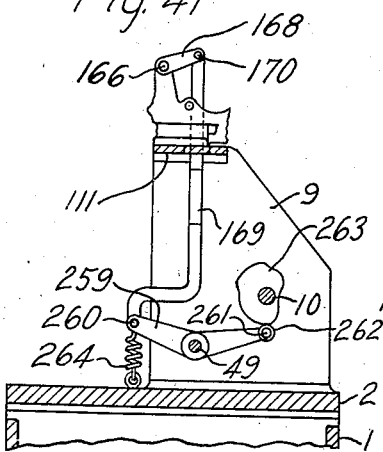
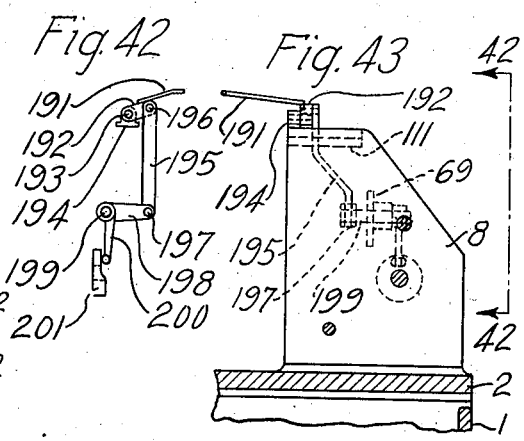
Inventor,
Melvin H. Sidebotham,
By, Roderick Wm Hoag, Att'y.

Patented Jan. 30, 1945

2,368,429

UNITED STATES PATENT OFFICE 2,368,429

MACHINE FOR MAKING PACKAGES

Melvin H. Sidebotham, Newton, Mass., assignor of one-half to Harlow M. Russell, Chelsea, Mass.

Application April 23, 1942, Serial No. 440,141

16 Claims. (Cl. 93—3)

This invention relates to apparatus for packaging commodities, and generally to that class of machines in which the product to be packaged, is wrapped and sealed within the fold of the wrapping material.

More particularly the invention relates to improvements in methods and machines for making tea bags, and the like having a string attached tag.

My invention consists in novelties of construction and in the coordination of novel devices; and I do not confine my invention to the form shown, as changes in construction and operation may be made without departing from the spirit of my invention.

One object of my invention is to provide a machine which is adapted to wrap or enclose predetermined amounts of a product within suitable wrapping material such as cellulosic or fibrous sheets.

The embodiment of my invention described and claimed in this present application contemplates the production of packages of the type shown and described in my copending application Serial No. 426,719, filed January 14, 1942. However, my present invention is not limited to machines for producing this particular type of package. Packages without string attached tags may be made on my improved machine.

Another object of my invention is to provide a machine which will, by a sequence of operations produce packages singly, successively and continuously, in a rapid, economical and efficient manner.

Another object of the invention is to provide a new and improved machine for controlling the commodity and wrapping materials while the package is being formed.

Another object of the invention to to provide a new and improved machine for making tea bags and the like having a string attached tag.

Other more specific objects and advantages of the invention will be apparent to persons skilled in the art as the same becomes better understood by reference to the following description, taken in connection with the accompanying drawings, in which I have illustrated one practical embodiment of my invention, and wherein:

Figure 5 is a plan view of a diagrammatic representation of the progressive operations of the machine in producing a tea bag with string attached tag.

Figure 6 is a side elevation of a diagrammatic representation of the progressive operations of the machine in producing a tea bag.

Figure 7 is a plan view of a portion of the prepared web from which the tea tags are formed.

Figure 8 is a side elevation of a portion of the tea tag web, shown in Figure 7.

Figure 9 is an end elevation of the completed tea bag with string attached tag.

Figure 10 is a side elevation of the completed tea bag shown in Figure 9.

Figure 11 is an enlarged front elevation of the commodity hopper assembly.

Figure 12 is an enlarged side elevation of the commodity hopper assembly.

Figure 13 is a section at 13—13 of Figure 12.

Figure 14 is a section at 14—14 of Figure 11.

Figure 15 is a section at 15—15 of Figure 12.

Figure 16 is an elevation of the wrapper web feeding and web cut-off assembly.

Figure 17 is a plan view of Figure 16.

Figure 18 is an elevation at 18—18 of Figure 19.

Figure 19 is an end elevation of Figure 16.

Figure 20 is an elevation of the tag feeding and tag cut-off mechanism, showing also the tag-string support.

Figure 21 is a plan view of Figure 20.

Figure 22 is an end view of Figure 21.

Figure 23 is an elevation of the vacuum chamber assembly.

Figure 24 is an end elevation of Figure 23.

Figure 25 is a partial section at 25—25—25 of Figure 23.

Figure 26 is an enlarged view at 26—26 of Figure 23 showing a fragment of the turret flange upon which the package is formed.

Figure 27 is a section at 27—27 of Figure 26.

Figure 28 is a partial vertical section through the machine showing the vacuum chamber shaft assembly.

Figure 29 is an elevation, partly in section, of a fragment of the vacuum chamber assembly, and valve operating means.

Figure 30 is a plan view of Figure 29.

Figure 31 is an end view, partly in section of Figure 29.

Figure 32 is a section at 32—32 of Figure 30.

Figure 33 is an end view of the tag string severing device shown in Figure 34.

Figure 34 is a partial vertical section showing the tag string severing device.

Figure 35 is a partial vertical section showing the mechanism for operating the heat sealing devices.

Figure 36 is an end view of the mechanism shown in Figure 37 for folding the wrapper and tag.

Figure 37 is a partial vertical section showing the mechanism for folding the wrapper and tag.

Figure 38 is a partial vertical section showing the tag cut-off operating mechanism.

Figure 39 is a partial vertical section showing the operating mechanism for actuating the commodity dispensing device.

Figure 40 is a partial vertical section illustrating the mechanism for operating the wrapper material feeding means, and for cutting off a section of the wrapper material from the wrapper material web.

Figure 41 is a partial vertical section illustrating the tag web feeding mechanism.

Figure 42 is a partial end view at 42—42 of Figure 43.

Figure 43 is a partial vertical section illustrating the operating mechanism for actuating the tag holding rod.

Similar reference characters indicate similar parts or features in all of the views.

Figure 1:
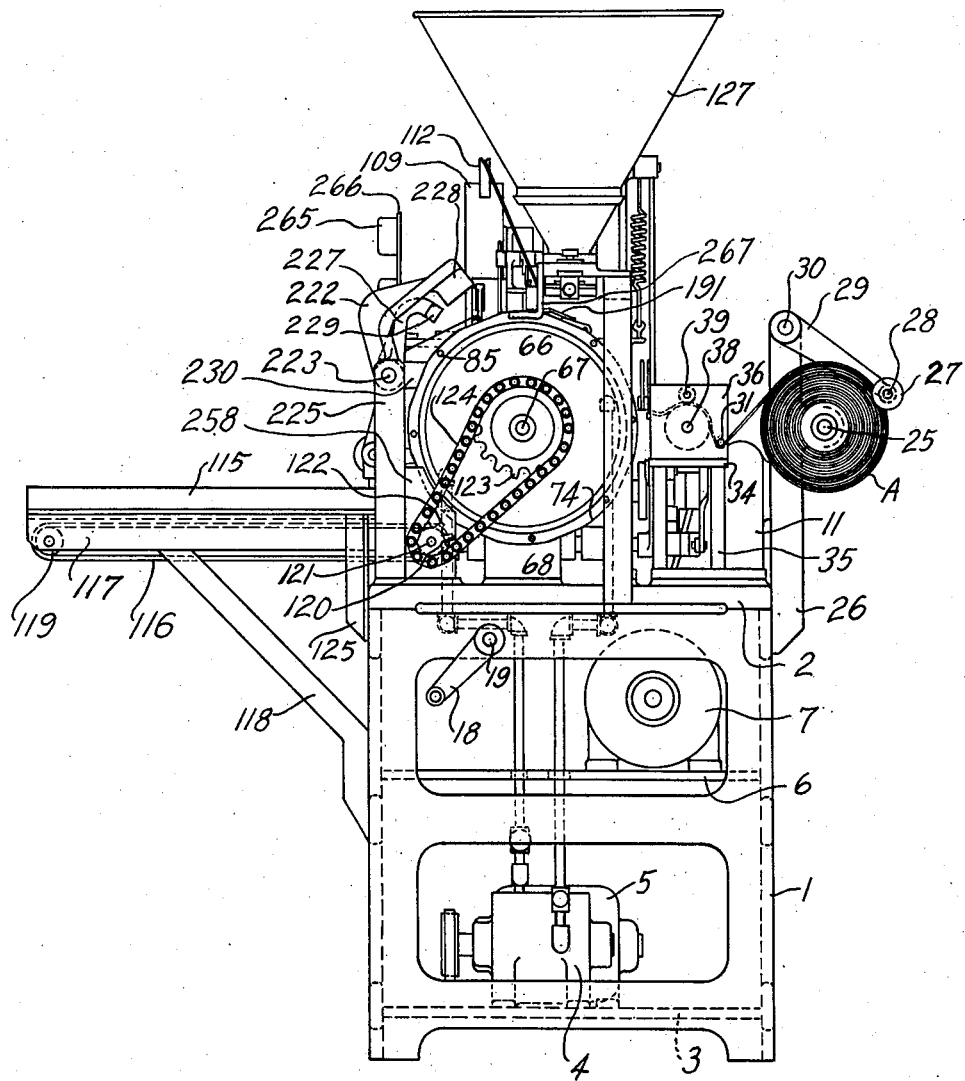
Figure 1 is a side elevation of a tea bag making machine constructed in accordance with the preferred embodiment of the invention.
Figure 2:
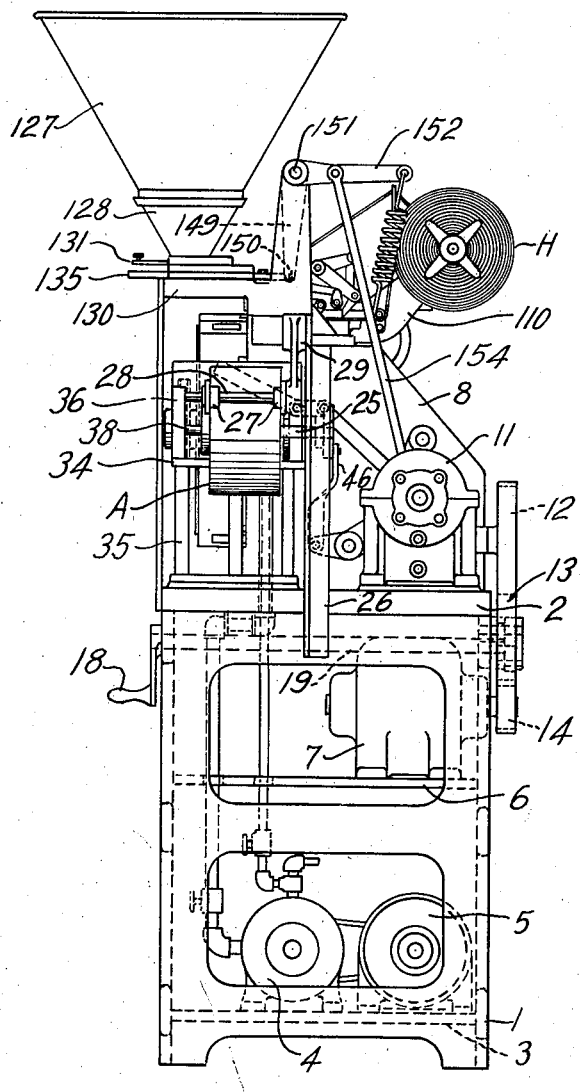
Figure 2 is an elevation of the feed end of the machine.
Figure 3:
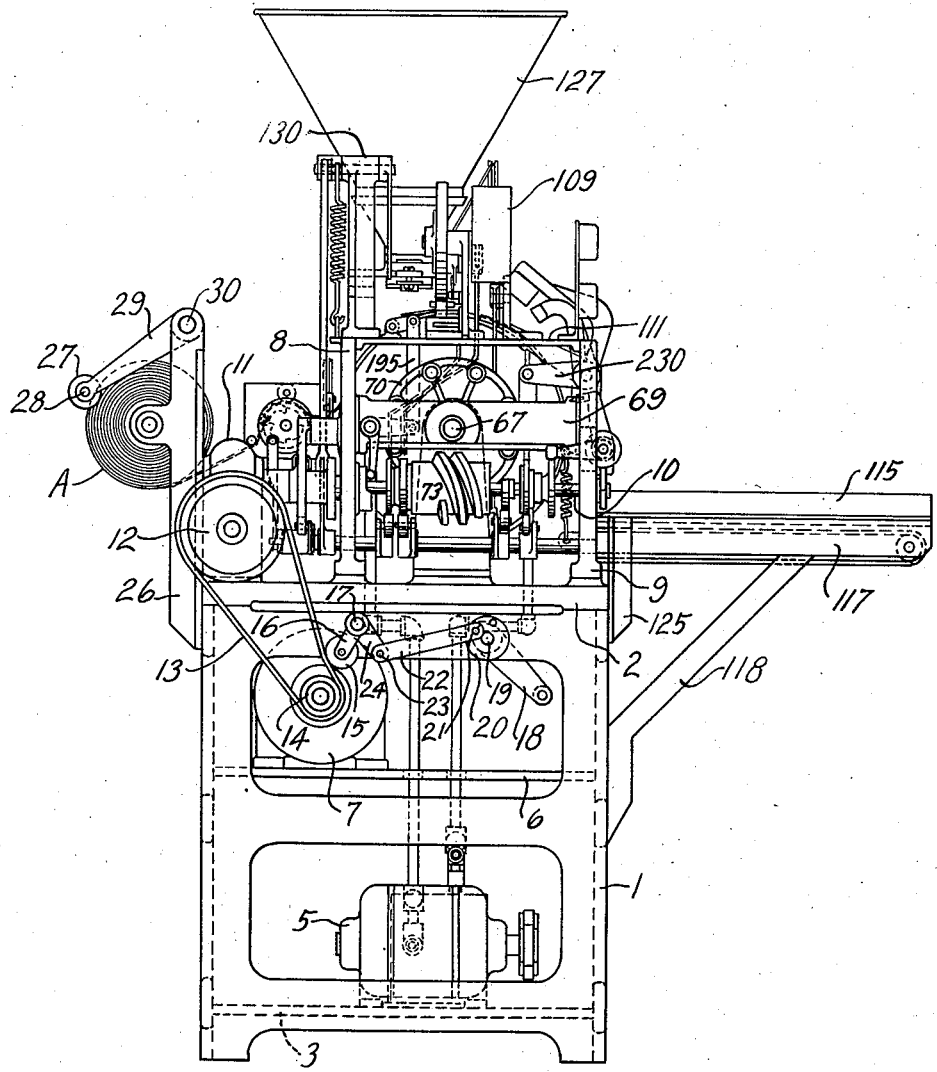
Figure 3 is a rear side elevation of the machine.
Figure 4:
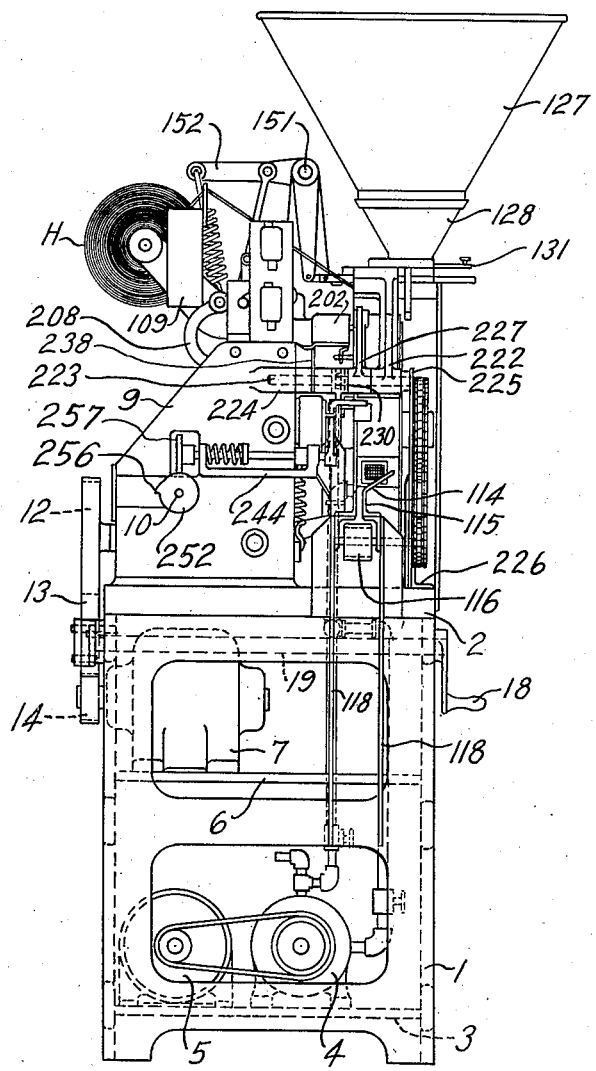
Figure 4 is an elevation of the delivery end of the machine.

It will aid toward an understanding of the operation of the machine and of the method of fabricating the package, to first explain the action of the machine which effects the production of packages with string attached tag, in substantially flat condition, by a sequence of operations.

Referring to Figures 5 and 6; there is diagrammatically illustrated the successive operations performed by the machine in producing complete packages. A supply roll of wrapper material A, the outer layer of which is passed under guide rod 31, and between feed roll 32 and retaining roll 33. Said rolls operate at predetermined intervals to draw a section of wrapper web from the supply roll A, causing the free end of the wrapper web to contact the surface of turret flange 74. The said turret flange is provided with suction means to cause the said wrapper web to be held firmly in place upon the outside surface of the said turret flange. The web A, is then transversely severed by shearing knife 57, thus providing an individual wrapper B positioned on the outer surface of the turret flange 74. The turret 66, of which the turret flange 74 is a part, is then caused to pivot about its center C, causing the wrapper B to move to position D, where a charge of commodity E is deposited upon a portion of the wrapper B. The commodity is retained in place upon the wrapper by suction; air being caused to pass about the commodity, through the wrapper, and then through a wire mesh screen on the turret flange 74, and thence the air flows to the inside of a suction chamber within the turret 66.

After the commodity to be packaged has been positioned on the wrapper, the turret 66 is again moved about pivot C causing the wrapper to move to position F. While the wrapper is travelling to said position F, a section of tag material is drawn from tag web roll H, and the end of the tag web H is positioned on the said turret flange 74 at position G, a predetermined distance from the wrapper material B. The end portion of the tag web is then severed, by knife 57, from the tag section H, to provide an individual tag I (Figs. 7 and 8). The pivoting of the turret 66 in moving from position G to F acts to draw a length of tag string K from the string hopper 109 and over string guide block 113 which serves to guide the string into position upon the wrapper sheet B and the tag I. At position G the wrapper sheet is folded along the line of the tag string, thus the tag string is within the fold of the wrapper sheet, and the commodity to be packaged is between the two leaves of the folded wrapper. The tag G is folded or doubled in the same manner as the wrapper sheet, with the tag string within the fold of the tag at a spaced apart distance from the folded wrapper. A heat sealing block 228 then acts to seal together the four outer margins M (Fig. 10) of the folded wrapper sheet, thus sealing the commodity within the folded wrapper sheet. The operation of sealing the wrapper also serves to secure the tag string within the fold of the wrapper. While the heat sealing operation is being performed on the wrapper, a similar heat sealing operation is being performed on a folded tag, to secure together the contacting surfaces of the folded tag. The tag sealing operation just described is performed on the tag which is secured to the tag string of the previously sealed package. The turret 66 then operates to advance the heat sealed package to position L where the string severing knife 240 operates to cut the tag string at the point between the extremity of the tag and the lower edge of the following sealed package. The completed package is then expelled from contact with the turret flange 74 by a slight burst of air from the turret 66. The action of the burst of air helps to carry the completed package in upright position to the delivery unit, where the packages are picked up and packed for shipment.

Figures 9 and 10 illustrate one type of package that may be produced on the machine herein described as the preferred embodiment of my invention. The wrapper material from which the body of the package is formed may be made of gauze, parchment paper, paper made from hemp pulp, or sheets made from thermoplastic materials. The wrapper material should be thin and porous, to permit water to pass freely therethrough, and yet have sufficient strength when wet, to retain the contents therein. The wrapper material may be of any desired kind, however, I prefer a wrapper material that has been previously treated with a thermoplastic substance, so that the wrapper material will have sealing qualities when subjected to heat and pressure. The four margins M of the package are sealed together by heat and pressure after the commodity E has been placed in position and the wrapper folded with the string O within the fold of the wrapper. The operation of sealing the margins M (Fig. 10) of the folded wrapper also serves to secure one end of the tag string O within the fold of the wrapper.

The tag material H and I (Figs. 5, 6, 7 and 8) from which the tag P (Figs. 9 and 10) is formed, is preferably made of thin paper cardboard having the surfaces adjacent to the string O, coated with a thermoplastic which will have adhesive qualities when subjected to heat and pressure.

The tag string O may be of any suitable material such as twisted or braided cotton or it may be made of paper or thermoplastic material. The web of tag material H (Figs. 5, 6, 7 and 8) is provided with scored lines R and holes S. The scored lines aid in folding or doubling the tag around the tag string after a tag section I has been cut from the tag web H. The holes S serve a double purpose in that they diminish the resistance of the tag to being folded on the scored line R, and provide for the register of the tag web with the tag web feeding mechanism.

*Machine frame and machine driving mechanism*

Referring to Figures 1, 2, 3 and 4, the several cooperating mechanisms comprising the complete machine are supported by a frame 1 the upper portion of which supports the main bed plate 2. Mounted within the frame 1 is a support plate 3 upon which is secured an air pump 4, and an electric motor 5, for driving the said air pump. Also secured within the frame 1 and below the bed plate 2 is a motor support plate 6, upon which is mounted an electric motor 7 for driving the machine. Two frame brackets 8 and 9 are mounted upon the top surface of the bed plate 2. A cam shaft 10, from which all the mechanically operated mechanisms of the machine are driven, is journalled in said frame brackets 8 and 9. One end of the said cam shaft 10 is positioned within, and driven by, gear reduction unit 11 mounted on the said bed plate 2. Gear reduction devices are well known in the art, and a detailed description is not believed necessary. The said gear reduction unit 11 is driven by a pulley 12 secured thereto. The pulley 12 is in turn driven by endless belt 13 from motor pulley 14 on motor 7. The machine driving motor 7 is operated continuously while the machine is in use. When the machine is to be operated to start packaging operations, the endless belt 13 is brought into tight frictional engagement with pulleys 12 and 14 by the movement of idler pulley 15 which is rotatably secured to bell-crank lever 16 mounted free on shaft 17 secured in frame 1. It will be obvious that pressure of the said idler pulley 15 on endless belt 13 will cause the said belt to frictionally engage the pulleys 12 and 14, with the result that the endless belt 13 will drive pulley 12 from power supplied by the rotation of motor pulley 14. When the packaging operation is to be stopped for a short time to make adjustments or to replenish the supply of the commodity or packaging materials, the idler pulley 15 is moved to release the pressure on the endless belt 13, with the result that the belt becomes slack on pulleys 12 and 14 and the transfer of power from the motor pulley 14 to pulley 12 will stop, because the endless belt 13 will lie slack on the said pulleys.

The idler pulley 15 is operated in and out of engagement with endless belt 13, to drive or stop the operation of the machine, by hand lever 18 secured to shaft 19 journalled in frame 1. A link disk 20, also secured to shaft 19, is provided with a pin 21 which is operatively secured to one end of connecting link 22. The opposite end of connecting link 22 is pivoted on pin 23 secured in arm 24 of bell-crank lever 16.

*Wrapper feeding and cut-off device*

The wrapper material, which comprises the body of the package, is taken at intervals from a supply roll A (Figs. 1, 2 and 3) rotatably mounted on pin 25 secured in bracket 26 attached to frame 1. Guide rollers 27 are mounted free on pin 28 supported by arm 29 pivotally mounted on pin 30 secured to bracket 26. The said guide rollers 27 serve to retain the web supply roll A in proper lateral position. The weight of the rollers 27, pin 28 and arm 29 serve to keep the guide rollers 27 in contact with the supply roll A. From the supply roll A, the web of wrapper material passes under guide rod 31 (Figs. 16 and 19) to the nip of feed roller 32 and retaining roller 33.

The wrapper web feeding unit and the wrapper web cut-off device are supported from plate 34 secured to bed plate 2 by standards 35. Bearing plates 36 and 37 have journalled therein a shaft 38 to which is secured the feed roller 32, and a shaft 39 to which is secured the retaining roller 33. A feed roller gear 40 is provided on feed roller 32, and meshes with a gear 41 secured to retaining roller 33.

The feed roller 32 is intermittently driven, to advance a section of wrapper web material, by ratchet 42 secured to feed roller shaft 38. Mounted free on said feed shaft 38 is a ratchet disc 43 provided with a paul pin 44 supporting a ratchet paul 45. It will be obvious that the ratchet 42 will be caused to revolve when the paul 45 engages the same. The paul 45 is caused to operate, to drive the ratchet, by rotary movement imparted to the ratchet disc 43 by web feeding link 46 mounted free on pin 47 in said ratchet disc 43.

The web feeding link 46 (Fig. 40) is caused to operate up and down at predetermined intervals by the rocking of web feeding lever 48 pivoted on shaft 49. The lower end of the web feeding link 46 is operatively connected by means of pin 50 to said lever 48. The opposite end of lever 48 is provided with a cam roller 51 which is held in contact with the surface of cam 52 by tension spring 53 which has one of its ends anchored in lever 48 and its other end attached to link 54. The cam 52, secured to cam shaft 10, is designed so that when it rotates, the cam wheel 51 is caused to travel first up and then down to impart the necessary rocking action to lever 48, to operate the wrapper feeding mechanism. Each upward movement of link 46 results in the feed roller 32, and the retaining roller 33, operating to draw a section of wrapper material from the supply roll A. The wrapper material passes from the feed roller 32, through the opening 55 (Fig. 16) in plate 56 and thence to turret flange 74 (Fig. 1). The web feeding mechanism is adjusted so that when a sufficient length of web material has been advanced to provide wrapping material for one package, a web severing device operates to cut off the wrapper material advanced from the web roll A.

The web cut-off device includes a shearing knife 57 (Figs. 18 and 19) pivoted on pin 58 secured in bearing plate 37. The shearing knife 57 is provided with an arm 59 to which a shearing knife link 54 is operatively connected by means of pin 60. The upward movement of said link 54 causes the shearing knife 57 to pivot downwardly to shear the wrapper web to provide a section of wrapper material sufficient for one package. The lower end of the shearing knife link 54 is operatively connected to lever 62 (Fig. 40) by means of pin 63. The said lever 62 is mounted free on pin 64 secured in frame bracket 8. A cam follower 65, rotatably mounted on pin 63, is retained in contact with the surface of cam 52. A tension spring 53, having one of its ends attached to shearing knife link 54 and its other end anchored in lever 48, operates to keep the cam follower 65 in engagement with cam 52 at all times. The rotation of cam 52 causes the lever 62 to first pivot upwardly to actuate the shearing knife which severs the web of wrapper material, and then to raise the knife ready for another severing operation.

*Turret, vacuum chamber, and delivery mechanisms*

From the wrapper web material feeding and wrapper web severing mechanisms, a section of wrapper material is delivered to the surface of turret flange 74 (Figs. 1, 2 and 23 to 32 inclusive).

The vertical turret 66 is secured to horizontal turret shaft 67 (Fig. 28) journalled in bearing 68 supported on bed plate 2; the outer end of the turret shaft 67 is journalled in bearing bracket 69 secured to frame brackets 8 and 9.

The turret shaft 67 is caused to come to a position of rest eight times with each revolution thereof. This operation is effected by means of driving disc 70 secured to shaft 67. The driving disc 70 has positioned in spaced apart relation on its outer margin, eight driving lugs 71 rotatably mounted on pins 72 secured in the said driving disc.

Each of the driving lugs 71 as they are brought to the lowest downward position is engaged by spiral worm gear 73 secured to cam shaft 10. The worm gear 73 is so designed that with each revolution thereof a corresponding driving lug on the driving disc 70 is positioned to be engaged by the spiral tooth of the said worm gear. Each revolution of the said worm gear 73 operates to turn the driving disc one-eighth of a revolution, and allows the driving disc to come to a position of rest before the worm gear engages the next driving lug to repeat the cycle. The turret 66 is secured to turret shaft 67 as is the driving disc 70; thus the turret 66 revolves in the same manner as the driving disc 70.

The turret 66 is provided with a continuous, horizontally extending radial flange 74. The said radial flange 74 is provided at eight positions on the outside thereof, with substantially flat surfaces 75.

Openings 76 (Figs. 25 and 26), through the flange 74, are provided at the position of each flat surface 75. Each opening 76 is covered with a screen of fine mesh wire 77, and the rim of the opening 76 is provided with a mat 78 of felt or other suitable material. A knife slot 79 is provided adjacent to each flat surface 75. A tag recess 80 is provided in close proximity to each knife slot 79. A tag string groove 81 (Fig. 24) into which the tag string is positioned, serves to hold the tag string in proper relation with the tag and the wrapper. A tag string clamping device (Fig. 26) comprising a clamp 82 is slidably retained in recess 83 by rod 84 secured in plunger 85. The plunger 85 is slidably positioned in pocket 86. A compression spring 87 is also positioned in pocket 86 behind the plunger 85. The said compression spring 87 acts to hold the string clamp 82 tightly against the inside of the string groove 81, to hold the tag string within the groove until the proper position of the turret is reached to release the tag string. The plunger 85 is normally positioned to project beyond the edge of the turret flange 74, so that in order to place the tag string within the groove 81, or to remove the tag string from the groove, it is merely necessary to press the projecting portion of the plunger 85 with the result that the clamp 82 will be released from engagement with the inside of groove 81. When pressure is removed from the projecting portion 85, the compression spring operates to return the clamp 82 tightly against the inside of groove 81 and to return the projecting portion of plunger 85 to its normally extended position.

The stationary vacuum chamber flange 88 (Figs. 23, 24 and 25) is positioned in contact with the inner diameter of turret flange 74. The said vacuum chamber flange 88 is maintained in stationary position at all times. The turret shaft 67, which supports the vacuum chamber flange, is free to rotate within the hub of said flange without rotating the same. The said vacuum chamber flange 88 is divided into six separate chambers 89, 90, 91, 92, 93 and 94, by means of partitions 95, 96, 97, 98, 99 and 100. Chambers 89 and 91 are connected together by air pipe 101. The chamber 89 is also provided with a pipe 102 which runs to the intake of air pump 4 (Figs. 1, 2, 3 and 4). Chamber 93 is connected by pipe 108 with the exhaust on the air pump 4. Partition 95, between chambers 89 and 90, has a round opening 103 (Figs. 29, 30, 31 and 32) therein which is provided with a butter-fly valve 104 mounted on spindle 105 pivotally positioned in vacuum chamber flange 88. The spindle 105 has secured thereto a lever 106 to one end of which is fastened a tension spring 107; the other end of the said spring 107 is anchored on pin 108 projecting from vacuum chamber flange 88. The butter-fly valve 104 is normally in open position within the opening 103. When it is desired to close the valve to stop the passage of air between chambers 89 and 90, the lever 106 is raised sufficiently to permit the tension in spring 107 to turn the spindle to close the valve. The operating mechanism for actuating lever 106 will be hereinafter described.

In the operation of the machine for producing filled packages with string attached tags, the wrapper material and the commodity to be packaged are held in place, on the turret flange 74, by suction produced by drawing air from certain chambers of the vacuum chamber flange 88, thus causing a pressure of air at the openings 76 in the turret flange.

From the wrapper feeding and cut-off mechanism a sheet of wrapper material is presented in register upon the wire mesh screen 77 over an opening 76 in the turret flange 74. The timing of the wrapper feed is such that an opening 76 in the turret flange arrives at the proper position to receive the wrapper as it leaves the cut-off device. The wrapper is held in position upon the screen 77 over the opening 76 by suction caused by the action of pump 4 drawing air from chamber 89 through air pipe 102.

With the wrapper in position on the turret flange 74, the turret is moved to carry the wrapper upward where the turret comes to a position of rest under the commodity discharging device. When a charge of commodity is freed above the wrapper it is drawn by suction to that portion of the wrapper that lies over the opening 76 in the turret flange 74. The wrapper material, being thin and porous does not prevent air passing freely therethrough, for that reason the commodity is held securely in place upon the wrapper by suction, in the same manner that the wrapper is held in position.

While the commodity is being delivered upon the wrapper, an unfolded tag is positioned in the tag recess 80 in turret flange 74, in advance of the wrapper. The tag thus positioned is to be attached to the proceeding package by a tag string in the sequence of singly and successively producing packages. The tag is positioned with approximately half of its length extending over the edge of the turret flange, so that when it is folded over the string, as presently to be described, it will not project over the edge of the turret flange.

The next operation provides for placing a continuous length of tag string upon the unfolded wrapper and upon the unfolded tag. A supply of tag string K (Figs. 20, 21 and 22) is contained in the string hopper 109 attached to the tag roll bracket 110 which in turn is secured to cross bar 111. The cross bar 111 connects together the frame brackets 8 and 9. The tag string K is drawn over string lead bar 112 secured to the string hopper 109, thence the string is drawn over string guide block 113 which is positioned directly over the point of the turret flange 74 where the wrappers and tags travel. From the string guide block 113 the string is laid over the wrapper and tag lying thereunder, and thence to the tag string groove 81 (Fig. 26) where the string is secured therein by clamp 82. The tag string is clamped within the string groove of the turret flange, and as the turret revolves, a corresponding length of string is drawn from the supply hopper.

The rotation of the turret flange 74 causes the clamp plungers 85 to successively contact the stationary clamp opening bar 267 secured to the carriage bracket 129. The clamp plunger 85, as it moves to position where the tag string enters the groove 81, is engaged by the plunger operating bar 267 which opens the clamp 82 to receive the tag string. After the said plunger 85 is moved out of contact with the bar 267 the plunger returns to its normal position and clamp 82 operates to hold the tag string within the groove 81.

In the next operation, the turret flange 74 is again rotated a part of a revolution to bring the wrapper, with the commodity positioned thereon, over chamber 90. While the turret flange is again brought to a momentary position of rest, a folding device, to be hereinafter described, operates to fold the free portion of the wrapper along a line parallel with, and adjacent to, the string positioned thereon. Thus the wrapper is folded with the commodity between the two layers of the wrapper, and the tag string within the fold of the wrapper. The unfolded tag positioned adjacent to the wrapper is folded simultaneously with the folding of the wrapper. The tag is likewise folded along a line parallel with, and adjacent to, the tag string overlying the same. While the wrapper and the adjacent tag are in this condition, a heat sealing device operates to heat seal the four margins of the folded wrapper, thus sealing the commodity within the wrapper to form a package. The string within the wrapper is also sealed within the package by the same operation. While the package is being sealed a similar operation is performed by the tag sealing unit to seal together the folded tag and to seal the tag string therein.

After the folding operation just described, has been performed, and while the heat sealing mechanisms are moving to perform the sealing operation; the suction action which holds the package in position on the turret flange, is diminished by partially closing the opening 103 in partition 95, by means of the butter-fly valve 104. The purpose of relieving the suction action on the wrapper prior to the heat sealing operation, is to allow the wrapper margins to be free of wrinkles while the sealing operation is being performed, to provide a smooth package. After the sealing operation has been completed the butter-fly valve is again opened, thus the suction action is again effected to hold the package in place.

In the next operation the turret flange is again revolved a part of a revolution, to bring the knife slot 79 (Fig. 26) in the turret flange, in position to receive the string severing knife 240, to sever the string at the point between the lower portion of a following package and the tag attached to the previously completed package.

The turret flange is again rotated a part of a revolution to bring the package over chamber 93. This chamber 93 is connected by air pipe 108 with the exhaust of the pump 4. This connection of the chamber 93 with the exhaust of the pump, serves to force air into the chamber 93, with the result that the package over the corresponding opening 76 in the turret flange 74, is expelled from contact with turret flange by the force of the air passing through the said opening. The expelled package with the string attached tag, is guided by plate 114 (Fig. 4) to fall in upright position between delivery angles 115, with the bottom edge of the package resting on endless delivery belt 116. The delivery angles 115 are supported by angles 117 which in turn are supported by brackets 118 and 125 secured to frame 1. The outer end of the delivery belt 116 is supported by idler pulley 119 journalled in angles 117. The opposite end of the delivery belt 116 is mounted on driven pulley 120 secured to shaft 121, journalled in plate 126. The shaft 121 is driven by sprocket 122. The sprocket 123 secured to turret shaft 67 operates to drive sprocket 122 by means of endless chain 124.

Commodity feeding mechanism

The commodity feeding mechanism is positioned above the turret flange 74 and is arranged so that the discharge opening is over the path of travel of the unfolded wrapper. The timing of the operation of mechanism for discharging the commodity is synchronized with the wrapper advancing means, so that the commodity is discharged at the time that a wrapper arrives in proper position to receive the charge.

A supply of the commodity to be packaged is placed in hopper 127 (Figs. 1, 2, 3, 4 and 11 to 15 inclusive) which is supported by hopper bracket 128 secured to carriage bracket 129. The carriage bracket 128 is supported by feeder support member 130 secured to the cross bar 111.

The hopper bracket 128 has an opening at the bottom thereof which is provided with a supply control shutter 131 slidably secured in the said hopper bracket. The purpose of the said shutter 131 is to close or open the opening in the hopper bracket 128 as desired. The said shutter has an opening 132 therein which, when it is in alinement with the opening in the hopper bracket 128, permits the commodity to pass therethrough. This is the normal position of the shutter and it is not changed while the machine is in operation. However, if the machine it to be shut down for any reason, or if a different commodity is to be packaged by the machine, or if it is desired to remove the contents of the hopper without having the commodity packaged, the shutter is pushed inward by hand so that the opening 132 in the shutter 131 will be moved away from the opening in hopper bracket 128, and thus a flat surface of the shutter 131 will close the opening in the hopper bracket.

In the operation of the commodity feeding mechanism, a supply of the material to be packaged is placed in the hopper 127. A portion of the commodity passes downward by gravity, through the openings in the hopper bracket 128 and shutter 131 and through opening 133 in the carriage bracket 129, thence the commodity comes to rest in a pocket 134 in carriage bar 135. The adjusting block 136 serves as the bottom of the pocket 134. The carriage bar 135 is slidably positioned in carriage bracket 129. The carriage bar 135 is moved at predetermined intervals to carry the commodity in the pocket 134 to the recess 137 formed by the opening between the stationary block 138 and the adjusting block 136. The feeding shutter 139 forms the bottom of said recess 137. The further movement of the carriage bar 135 causes the feeding shutter 139 to open the bottom of recess 137 with the result that the commodity contained therein will fall free of the recess. The carriage bar 135 then returns to its original position with the pocket 134 in alinement with the opening 133 in the carriage bracket 129. The feeding shutter 139 is kept in engagement with carriage bar 135 by means of bolt 140, therefore when the carriage bar returns to its normal position the feeding shutter operates to again close the bottom of recess 137.

The size of recess 137 may be increased or decreased as desired, by changing the position of adjusting bar 136 in its relation with stationary block 138. This is effected by turning adjusting nut 141 which is operatively positioned on stud 142. The opposite end of the stud 142 is secured in stationary stud bar 143. The adjusting bar 136 is held in engagement with the adjusting nut 141 by a compression spring 144 on stud 142. It will be obvious that by turning the nut 141 on the screw threads of the stud 142, in the conventional manner, the adjusting bar 136 will be moved to approach or recede from the stationary block 138, depending on whether the recess is desired to be made smaller or larger. The adjusting bar 136 is supported by adjusting bar guides 145 secured to the under side of carriage bracket 129. The feed shutter 139 is held in operating position, against the adjusting bar 136 and the stationary block 138, by shutter guides 146 secured to the adjusting bar guides 145.

The carriage bar 135, and the feed shutter 139 attached thereto, are operated at timed intervals to carry the commodity to be packaged, from the hopper and discharge it through recess 137. Movement is imparted to the carriage bar 135 by carriage link 147 pivotally secured to pin 148 in the end of carriage bar 135. The other end of the carriage link 147 is pivotally secured to carriage lever 149 (Fig. 2) by means of pin 150. The hub end of carriage lever 149 is secured to shaft 151 journalled in feeder bracket 130. The said shaft 151 is actuated by lever 152, to pivot the carriage lever 149, first forward and then backward, to operate the carriage bar 135. Operatively secured to lever 152, by means of pin 153, is a connecting link 154 (Fig. 39) having its lower end pivotally secured by pin 155 to the outer end of lever 156 which is pivotally mounted on pin 157. A cam follower 158 is rotatably mounted on said pin 155. A tension spring 159, having one end secured to lever 152 and its other end anchored in frame bracket 8, operates through link 154 to maintain the cam follower 158 at all times in contact with the surface of cam 160 which is secured to cam shaft 10. Each rotation of the cam 160 first causes the link 154 to move upward and then downward. This motion is transmitted, by means just described, to actuate the carriage bar 135 of the commodity feeding mechanism.

*Tag feeding, holding and cutting mechanisms; and tag string feeding means*

The tag feeding unit (Figs. 20, 21 and 22) is composed of the tag roll bracket and the mechanisms supported thereon. The tag supply roll H is mounted on spindle 161 secured in the tag roll bracket 110. A web of tag material is drawn from the supply roll H and passed under pin 162 on the tag roll bracket, thence the tag web is led over platen 163.

The tag web is advanced intermittently by the successive engagement of finger 164 with the holes S (Fig. 7) which are provided in the tag web. The finger 164 is actuated through pin 174 by lever 165 secured to shaft 166 pivoted in bearing 167 of the tag roll bracket 110. Also secured to shaft 166 is a lever 168 which is connected to link 169 by means of pin 170. The shaft 166 has secured thereto a lever 171 which is connected by pin 172 with link 173 which in turn is connected by means of pin 175 to score breaker 176 which is pivoted on pin 177 secured to tag roll bracket 110.

The downward movement of link 169 operates to move the ends of levers 165 and 168 downward, with the result that the point of finger 164 engages one of the holes S in the tag web and urges the tag web forward, thus feeding a length of tag web sufficient for one tag. The motion of link 169 is then reversed and the link moved upward with the result that the finger 164 is brought back to its original position to repeat the operation of feeding another length of tag web. The lower end of link 169 is connected to one arm of lever 259 by means of pin 260. The lever 259 is fulcrumed on shaft 49. A second arm of lever 259 is provided with a pin 261 upon which is positioned a cam roller 262. The cam roller 262 is maintained at all times in contact with cam 263 secured to cam shaft 10. The tension spring 264, having one end secured to pin 260 and its other end anchored in bed plate 2, serves to hold the cam roller 262 in contact with the cam 263. The rotation of cam 263, acting through cam roller 261, and lever 259, serves to impart to link 169 the movement necessary to perform the desired functions.

The further movement upward of the link 169, (Figs. 20 and 41) serves to cause the lever 171 to move downward, with the result that link 173 connected therewith operates to bring the score-breaker 176 into contact with the tag web and to momentarily bend the tag web downward to break the score R, thus rendering the tag folding operation less difficult. With each downward movement of link 169 a length of tag material is advanced from the supply roll, and with each upward movement of the link 169 the tag web feeding mechanism returns to position to repeat the feeding operation. Each upward movement of link 169 also operates the mechanism which breaks a score R in the tag web.

Positioned above the tag web is a device which prevents the tag web from slipping in the direction opposite to the normal travel of the tag web. This device consists of a friction dog 178 pivoted on pin 179 secured in tag roll bracket 110. The point of the friction dog 178 is so positioned that it is normally in engagement with the tag web and offers no appreciable resistance to the travel of the tag web away from the direction of the tag supply roll. However, if the web tends to move backward toward the tag supply roll, the point of the friction dog will dig into the web and prevent movement of the web in the direction of the tag web roll.

From the tag web feeding mechanism the tag web advances to the tag cut-off device which comprises a shearing knife 180 positioned at right angles to the travel of the tag web. The said shearing knife is secured to one end of a lever 181 fulcrumed on pin 182 secured in tag roll bracket 110. The said lever 181 is actuated to cause the shearing knife 180 to operate up and down at predetermined intervals to cut lengths of tag material from the web as it is advanced. Each shearing operation provides from the tag web sufficient material for one tag.

The link 183 is operated up and down at timed intervals by lever 185 (Fig. 38) fulcrumed on shaft 49. The pin 186 serves to pivotally connect said link 183 with one end of lever 185. The opposite end of lever 185 is provided with a pin 187 upon which is mounted a cam follower 188. The cam follower 188 is maintained at all times in contact with the surface of the cam 189 which is secured to cam shaft 10. Each revolution of cam 189 causes the lever 185 to operate the link 183 first upward to and then downward, to actuate the shearing knife 180 as above described. A tension spring 190, having one of its ends secured in link 183 and its other end anchored in bed plate 2, serves in an obvious manner to keep the cam follower 188 in contact with the surface of cam 189.

At the time that the unfolded tag is being severed from the tag web by shearing knife 180, the portion of the tag positioned in the tag recess 80 in turret flange 74, is held in place in said recess by the tag holding rod 191 (Figs. 42 and 43). The operation of this tag holding rod serves to frictionally hold the unfolded tag in position on the turret flange 74 until the turret flange is moved to the position where a length of tag string is laid upon the tag, the string thereafter serves to hold the tag in proper position. The said tag holding rod 191 is secured to, and operated up and down at predetermined intervals, by link 192 which is pivoted on pin 193 secured in bearing 194 attached to frame cross bar 111. The said link 192 is actuated by vertical link 195 pivotally secured to pin 196 in link 192. The lower end of vertical link 195 is pivotally secured to pin 197 on lever 198. The lever 198 is secured to one end of shaft 199 pivotally supported in turret shaft bearing 69. The cam follower lever 200 secured to shaft 199 is operated by a cam 201 which is secured to cam shaft 10. Each rotation of cam 201 serves to move the link 195 up and down at timed intervals to cause the tag holding rod 191 to engage and release unfolded tags as previously described.

The tag string K is drawn from the tag string hopper 109 (Figs. 1, 20, 21 and 22) and over bar 112, thence the string passes to string guide block 113 secured to tag bracket 110. The string guide block 113 is positioned to guide the tag string into the tag string groove 81 in the turret flange 74. The tag string is clamped in the tag string groove 81 by means of a string clamping device hereinafter described. The said clamping device is opened to receive the tag string by engagement of a plunger 85 with a clamp opening bar 267 (Fig. 1). After the turret flange 74 has been revolved to carry the string clamping device out of contact with the clamp opening bar 267, the clamp operates to secure the tag string within the tag groove 81. The rotation of the turret flange 74 serves to draw the tag string from the tag string hopper 109 and lay the tag string over the unfolded wrapper and tag positioned on the said turret flange.

*Wrapper folding and tag folding mechanism*

The wrapper folding and tag folding operation is effected by the action of folding bar 202 (Figs. 36 and 37) which operates first upwardly and then horizontally to raise a portion of the wrapper and fold it over the string positioned thereon. Thus the wrapper is folded double with the commodity positioned therein. The wrapper folding operation is aided by the flow of air which is drawn through the wrapper at the point where the commodity is positioned thereon. The folding bar 202 starts the folding operation, but before the folding operation is completed, the suction caused by the flow of air through wrapper completes the folding operation, by drawing the portion of the wrapper being lifted firmly over the portion of the wrapper containing the commodity.

The folding bar 202 has secured thereto an operating bar 203 in which a slot pin 204 and a pivot pin 205 are secured. The slot pin 204 is slidably positioned in a slot 206 provided in slotted angle 207 secured to cross bar 111. The pivot pin 205 is engaged by operating lever 208 secured to shaft 209 operatively mounted in a bearing 210 which is secured to the turret bearing 69. A link lever 211 secured to shaft 209 has a link 213 pivotally secured thereto by means of pin 212. The lower end of link 213 is secured to lever 214 by pin 215. The lever 214 is fulcrumed on shaft 49, and is operated by a cam roller 216 rotatably mounted on pin 217 secured in an arm of said lever 214. The cam roller 216 engages a cam 218 which is secured to cam shaft 10. A tension spring 219 has its upper end secured to lever 211 by means of eye bolt 220, and the lower end of the said spring is anchored in eye bolt 221 secured in bed plate 2. The spring 219 serves in an obvious manner to maintain the cam roller 216 in contact with the cam 218. Each rotation of the cam 218 causes the link 213 to move first upward and then downward. The downward movement of the link 213, acting through levers 211 and 208, causes the operating bar 203 to lift the folding bar 202 first upwardly at an angle and then horizontally. This motion is imparted to the operating bar 203 by the pivoting and sliding action of pin 204 as it is moved in slot 206 in the angle 207. The pin 204 is caused to move in the slot 206 by lever 208 acting through pin 205.

While the folder bar 202 is performing the operation of folding the package wrapper, the said folder bar is at the same time folding the tag material over tag string positioned thereon.

*Wrapper and tag sealing mechanism*

After the completion of the wrapper folding and tag folding operations have been completed, the folded wrapper and the folded tag are subjected to the action of heat sealing devices which seal together the superposed margins of the wrapper, and seal together the contacting surfaces of the doubled tag. The sealing operation also causes the section of tag string within the wrapper to be secured thereto; and the tag sealing operation results in the tag string within the fold of the tag being sealed therein.

The wrapper sealing arm 222 (Figs. 1 and 4) which supports wrapper sealing block 228 is secured to heater operating shaft 223 one end of which is mounted free in bearing 224 in frame bracket 9 and the other end in support bar 225 which is secured to angle 226 fastened to bed plate 2. Also secured to shaft 223 is the tag sealing arm 227 to which the tag sealing block 229 is fastened. The operating lever 230 (Figs. 4 and 35) secured to shaft 223 is operated up and down at predetermined intervals by link 231 (Fig. 35)

pivotally secured to said lever 230 by pin 232. Up and down motion is imparted to link 231 by bell-crank lever 233 pivotally connected to the lower end of link 231 by pin 234. The said bell-crank lever 233 is pivotally positioned on shaft 49. One arm of the said lever 233 has secured thereto a pin 235 upon which is rotatably mounted a cam roller 236. The cam roller 236 is kept in contact with the surface of cam 237, which is secured to cam shaft 10, by the tension spring 238 the lower end of which is secured to bell-crank lever 233. The upper end of the said spring 238 is anchored in eye bolt 239 secured in crossbar 111. The rotation of cam 237, acting through the cam roller 236 and pin 235, causes the bell-crank lever to rock on shaft 49. Thus the link 231 is moved first downward to bring the wrapper sealing block 228 into sealing contact with the package, and the tag sealing block 229 into sealing contact with the folded tag. The upward movement of link 231 results in the wrapper sealing block and the tag sealing block being raised upwardly ready to operate again at the next revolution of cam 237.

The energy for supplying heat to the wrapper sealing block 228 and the tag sealing block 229 may be of any desired kind. However, electric energy is preferred. The wrapper sealing block 228 and the tag sealing block 229 are connected by electric wires to switch boxes 265 (Figs. 1 and 4) mounted on panel 266 secured to tie bar 111. The electric wiring has been omitted from the drawings for the sake of clearness.

While the wrapper sealing operation is being performed, the suction action, which holds the wrapper tightly in position on the turret flange 74, is partially released, with the result that the wrapper will return to a more flat condition and thus conform more readily to the action of the wrapper sealing block 228.

The mechanism which causes the reduction of suction which holds the wrapper in place, has been included in the description of the vacuum chamber. However, the operating device which actuates the mechanism for reducing the suction, comprises a plate lever 241 (Fig. 29) which is secured to shaft 223. Secured to the outer end of plate lever 241 is a pin 255.

Each downward movement of the wrapper sealing arm 222 which is secured to shaft 223, as is the plate lever 241, causes the pin 255 on said lever 241 to actuate the mechanism which reduces the suction action on the wrapper.

*Tag string cutting and package expelling mechanism*

After the wrapper sealing and tag sealing operations have been completed, the turret flange 74 is again rotated a part of a revolution to bring the package previously sealed into position to have the tag string severed at the point where the tag string connects with the succeeding package assembly.

The tag string cutting devices comprises a knife 240 (Figs. 4, 33 and 34) fixed in knife holder 242 which is secured to shaft 243. The said shaft 243 is mounted in bracket 244 which is secured to frame bracket 9. The shaft 243 is provided with a spring lever 245 which has a tension spring 246 secured to its outer end. The other end of the spring 246 is anchored in lug 247 secured to frame bracket 9. Also secured to shaft 243 is a cam lever 249 which is provided with a cam follower 250. The cam follower 250 is positioned to engage cam 251 secured to cam shaft 10. Also secured to cam shaft 10 is a hook disc 252. Mounted on shaft 243 is a compression spring 253 which is positioned between bracket 244 and collar 254 secured to said shaft.

In the operation of the tag string cutting device each revolution of cam 251 causes the cam follower 250 to move downward as it follows the contour of the said cam 251. The downward movement of the cam follower 250 causes the cam lever 249 to turn the shaft 243, with the result that spring lever 245 and knife holder 242 will pivot on shaft 243. The cam follower 250 is maintained in contact with the surface of cam 251 by the action of the tension spring 246. It will be obvious that the downward movement of the cam follower 250 will move the knife 240 to engage the turret flange 74. The timing of the cam action and the revolving of the turret flange is such that the cutting knife 240 will enter the knife slot 79 in the turret flange 74 at predetermined intervals to contact the tag string which lies across the said knife slot.

While the knife 240 is in contact with the tag string, the knife is drawn across the string to sever the same, by the action of hook disc 252 (Figs. 4, 33 and 34) which each revolution thereof causes hook 256 to engage disc 257 thus drawing the disc 257 and the shaft 243 longitudinally thereof, with the result that the knife 240 will be drawn across the tag string to sever the same. The hook 256 on the hook disc 252 is so designed that it only momentarily engages the disc 257 which is held in normal position by the compression spring 253.

While the tag string cutting operation is being performed, the completed package is expelled from the surface of the turret flange 74 by the passage of air from the chamber 93 through an opening 76 in the said turret flange. The chamber 93 is connected by means of air pipe 108 with the exhaust of the air pump 4. The action of the current of air passing through the opening 76 caused the package to be moved outwardly away from the turret flange, but the package remains in hinged contact with the turret flange 74 until the tag string is released from the tag string clamp 82. The rotation of turret flange 77 causes the plungers 85 (Fig. 26) positioned in the rim of the turret flange 77 to be successively engaged by plate 258 which is secured to support bar 225. The plungers 85 are successively pushed inwardly by contact with said plate 258. The result of pushing the plunger inward is to release the tag string clamp 82 from contact with the tag string on the completed package. The timing of the engagement of the plunger 85 with plate 258 is such that after the tag string cutting operation has been performed and the package has been blown outwardly hinged from the turret flange, the corresponding plunger 85 will release the clamp 82 which hold the tag string to the turret flange.

When the package assembly is free from all engagement with the turret flange 74 it falls upon the diagonal package guide 114 which serves to guide the package downward in upright position between the angles 115. Thus the bottom edge of the package contacts the delivery belt 116 which is driven by means previously described. The completed packages are picked up from the delivery belt 116 and packed for shipment.

Changes in the construction, operation, and sequence of operations of my improved machine may be made without departing from the spirit of my invention. The vertical turret and the turret flange may be designed to operate with the turret and turret flange moving in a horizontal plane, and yet come within the scope of my invention.

I have described and illustrated a machine for producing tea bags with string attached tag, however I do not limit my invention to the making of such specific package, nor do I limit my invention to the packing of tea, as many other commodities may be packaged by use of this machine.

Having now described my invention, I claim:

1. In a machine of the class described, means for advancing wrapper material, a turret flange having means for retaining individual wrappers thereon, a commodity dispensing device for depositing charges of a commodity upon individual wrappers, tag web feeding means for advancing the end of a tag web, a tag web cut-off mechanism, means for guiding a tag string into position upon the turret flange and to overlie wrapper material and tag material, means for folding the wrapper material over the tag string positioned thereon, and means for heat sealing the wrapper and the tag string attached thereto, and sealing means for securing the tag string to the tag.

2. In a machine of the class described, means for advancing wrapper material, a commodity dispensing device for depositing charges of a commodity upon individual wrappers, tag web feeding means for advancing a tag web, a tag cut-off mechanism, means for guiding a tag string to overlie wrapper material and tag material, means for folding the wrapper material over the tag string positioned thereon, and means for heat sealing the wrapper and the tag string attached thereto, and sealing means for securing the tag string to the tag.

3. In a machine of the class described, means for advancing wrapper material, a commodity dispensing device for depositing charges of a commodity upon individual wrappers, tag web feeding means for advancing a tag web, a tag cut-off mechanism, means for placing a tag string to overlie wrapper material and tag material, means for folding the wrapper material with the tag string positioned within the fold, and means for heat sealing the wrapper and the tag string attached thereto, and means for securing the tag string to the tag.

4. In a machine of the class described, a device for picking up, holding, advancing and expelling individual wrappers, comprising a circular turret, an annular turret flange extending from the periphery of the turret, a plurality of individual screens positioned over openings through the turret flange, a vacuum chamber flange having a plurality of vacuum chambers formed in its outer periphery, the outer periphery of the vacuum chamber flange being designed to fit snugly against the inner diameter of the turret flange, an air suction pipe connected with one of the vacuum chambers, for drawing air from the vacuum chamber, a valve positioned in an opening between said vacuum chamber and a second vacuum chamber, an air pipe connection between the first vacuum chamber and a third vacuum chamber, and an air exhaust pipe connected with a fourth vacuum chamber to force air into said fourth vacuum chamber; means to revolve the turret flange to cause the screens positioned over the openings in the turret flange to pass successively over the vacuum chambers.

5. In a machine of the class described, a device for picking up, holding and advancing individual wrappers, comprising a circular turret, an annular turret flange extending from the periphery of the turret, a plurality of individual screens positioned over openings through the turret flange, a vacuum chamber flange having a plurality of vacuum chambers formed in its outer periphery, the outer periphery of the vacuum chamber flange being designed to fit against the inner diameter of the turret flange, an air suction pipe connected with one of the vacuum chambers, for drawing air from the vacuum chamber, a valve positioned in an opening between said vacuum chamber and a second vacuum chamber, an air pipe connection between the first vacuum chamber and a third vacuum chamber; and means to revolve the turret flange to cause the screens positioned over the openings in the turret flange to pass successively over the vacuum chambers.

6. In a machine of the class described, a device for advancing individual wrappers, comprising a turret, a turret flange having a plurality of openings therethrough, a vacuum chamber flange having a plurality of vacuum chambers formed in its outer periphery, an air suction pipe connected with a first vacuum chamber, a valve positioned in an opening between the first vacuum chamber and a second vacuum chamber, an air pipe connection between the first vacuum chamber and a third vacuum chamber; and means to revolve the turret flange about the vacuum chambers.

7. In a machine of the class described, a device for advancing individual wrappers, comprising a turret flange having a plurality of openings therethrough, a vacuum chamber flange having a plurality of vacuum chambers formed in its outer periphery, an air suction pipe connected with a first vacuum chamber, a valve positioned in an opening between the first vacuum chamber and a second vacuum chamber, an air pipe connection between the first vacuum chamber and a third vacuum chamber.

8. In a machine of the class described, a device for advancing individual wrappers, comprising, a turret flange having a plurality of openings therethrough, a vacuum chamber flange having a plurality of vacuum chambers formed in its outer periphery, the outer periphery of the vacuum chamber flange being designed to fit against the inner surface of the turret flange, means for drawing air from a first vacuum chamber, means to regulate the flow of air between the first vacuum chamber and a second vacuum chamber, means to permit the passage of air from the first vacuum chamber to a third vacuum chamber, and means to force air into a fourth vacuum chamber.

9. In a machine of the class described, a device for advancing individual wrappers, comprising a turret flange having a plurality of openings therethrough, a vacuum chamber flange having a plurality of vacuum chambers formed in its outer periphery, the outer periphery of the vacuum chamber flange being designed to fit against the inner surface of the turret flange, means for drawing air from a first vacuum chamber, means to allow a limited flow of air between the first vacuum chamber and a second vacuum chamber, means to permit the passage of air from the first vacuum chamber to a third vacuum chamber.

10. In a machine of the class described, a device for advancing individual wrappers, comprising a turret flange having a plurality of openings therethrough, a vacuum chamber flange having vacuum chambers formed therein, means for drawing air from a first vacuum chamber, means to limit the flow of air between the first vacuum chamber and a second vacuum chamber, means to permit the passage of air from the first vacuum chamber to a third vacuum chamber.

11. In a machine of the class described, a device for advancing individual wrappers, comprising a turret flange having a plurality of openings therethrough, suction means to cause wrappers to adhere to the areas of the turret flange about the openings therein, and mechanism to revolve the turret flange.

12. In a machine of the class described, means for advancing individual wrappers, a commodity dispensing device for depositing charges of a commodity upon the individual wrappers; means for positioning individual tags spaced apart from the individual wrappers, comprising a bracket, a spindle secured in the bracket for supporting a roll of tag web material, a tag web feeding finger designed to engage recesses in the tag web, means for actuating the web feeding finger to advance the tag web, a tag score breaker for bending the tag web at predetermined points to break a scored line thereon, and a tag web shearing knife to sever the tag at predetermined places to provide individual tags.

13. In a machine of the class described, means for advancing individual wrappers, a commodity dispensing device for depositing charges of a commodity upon the individual wrappers; means for positioning individual tags in spaced apart relation from the individual wrappers, comprising means for supporting a roll of tag web material, a tag web feeding device for engaging recesses in the tag web to advance the same, and a tag shearing knife to cut off individual tags from the tag web; means for superimposing a length of tag string over a series of wrappers and tags, a folding device for doubling wrappers and tags over the tag string positioned thereon, and means for heat sealing the wrappers and the tags.

14. In a machine of the class described, means for advancing individual wrappers, a commodity dispensing device, means for positioning individual tags in spaced-apart relation from the individual wrappers, means for superimposing a length of tag string over a series of wrappers and tags, a folding device for folding the wrappers and tags over the tag string, sealing means to seal the wrappers and tags, and means to sever the string at predetermined points.

15. In a package making and filling machine, means to produce individual package wrappers, suction means to hold each wrapper in position to receive a charge of commodity to be packaged, suction means to guide the delivery of the commodity to each wrapper, and suction means to hold the commodity in place on the wrapper while the commodity is being wrapped.

16. In a packaging machine, suction means for guiding the delivery of a commodity to a package wrapper, suction means to hold the commodity in place on the package wrapper, and a folding device to enclose the commodity within the package wrapper.

MELVIN H. SIDEBOTHAM.